(12) United States Patent
Fedorov

(10) Patent No.: US 8,372,947 B2
(45) Date of Patent: Feb. 12, 2013

(54) FOLDABLE HYDROGEN STORAGE MEDIA AND METHODS

(75) Inventor: Andrei G. Fedorov, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1201 days.

(21) Appl. No.: 11/713,375

(22) Filed: Mar. 2, 2007

(65) Prior Publication Data

US 2008/0081900 A1 Apr. 3, 2008

Related U.S. Application Data

(60) Provisional application No. 60/849,064, filed on Oct. 3, 2006.

(51) Int. Cl.
*C08J 3/00* (2006.01)
*C01B 3/02* (2006.01)

(52) U.S. Cl. .................. 528/490; 423/648.1; 423/658.2

(58) Field of Classification Search ................ 423/658.3
See application file for complete search history.

(56) References Cited

FOREIGN PATENT DOCUMENTS

WO WO/2005/075663 * 8/2005

OTHER PUBLICATIONS

Sunita Satyapal, "Hydrogen Production and Storage R&D Activities at the U.S. Department of Energy".

Xuebo Zhao, et al., "Model behaviour," Materials World, Jun. 2005, pp. 21-23.
"Hysteretic Adsorption and Desorption of Hydrogen by Nanoporous Metal-Organic frameworks," Science, vol. 306, pp. 1012-1015, Nov. 5, 2004.
"Filling Up With Hydrogen," Chemical & Engineering News, vol. 83, No. 34, pp. 42-47, Aug. 22, 2005.
"Building a better hydrogen trap" U or M News Service, Nov. 17, 2005.
Hee K. Chae, et al., "A route to high surface area, porosity and inclusion of large molecules in crystals," Letters to Nature, vol. 417, pp. 523-527, Feb. 5, 2004.
"Hydrogen Storage in Microporous Metal-Organic frameworks," Science, vol. 300, pp. 1127-1129, May 16, 2003.
Tina Duren, et al., "Design of New Materials for Methane Storage," Langmuir 2004, 20, 2683-2689.

* cited by examiner

*Primary Examiner* — Melvin C Mayes
*Assistant Examiner* — Yun Qian
(74) *Attorney, Agent, or Firm* — Thomas Horstemeyer, LLP

(57) ABSTRACT

Reversible, high density hydrogen storage that provides a mechanism for reversible uptake/storage/release of hydrogen fuel in response to combination of thermal, mechanical, magnetic, electrical, optical or chemical stimuli. Exemplary media are based on natural and/or synthetic composite materials, and potentially can achieve the highest possible storage density, while using a simple, fast and energy-efficient means for hydrogen uptake and release when needed.

5 Claims, 4 Drawing Sheets

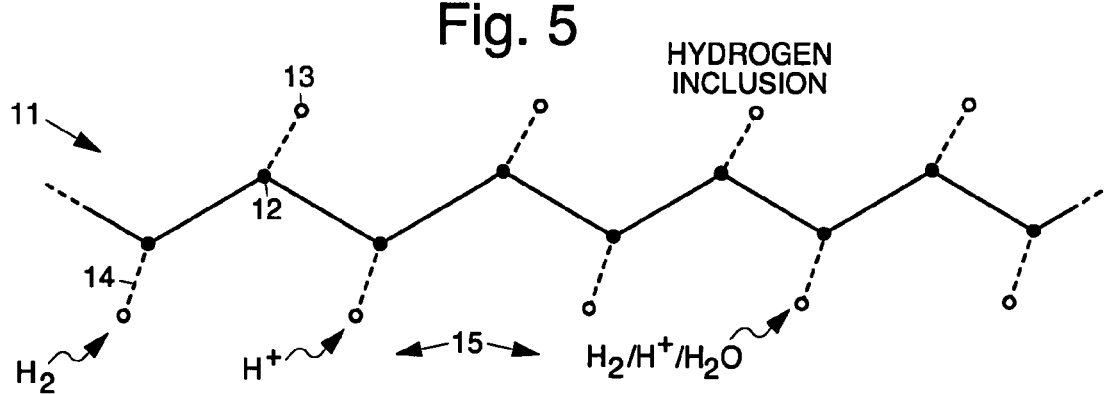
Fig. 5 HYDROGEN INCLUSION
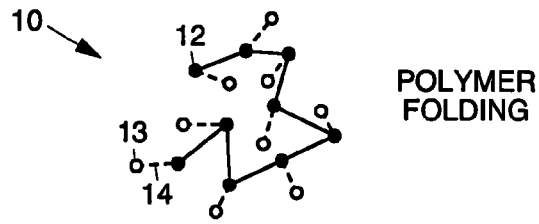
Fig. 6 POLYMER FOLDING
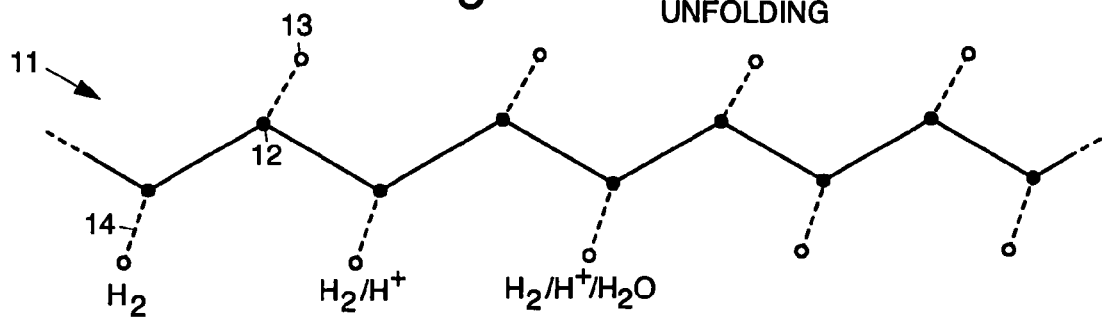
Fig. 7 POLYMER UNFOLDING
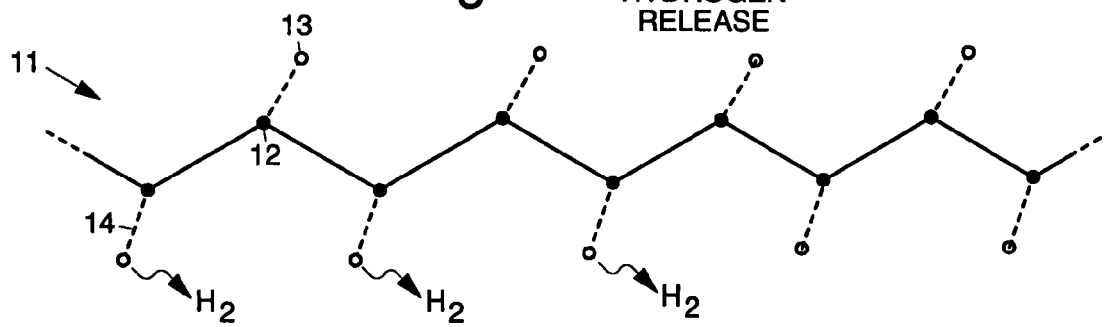
Fig. 8 HYDROGEN RELEASE

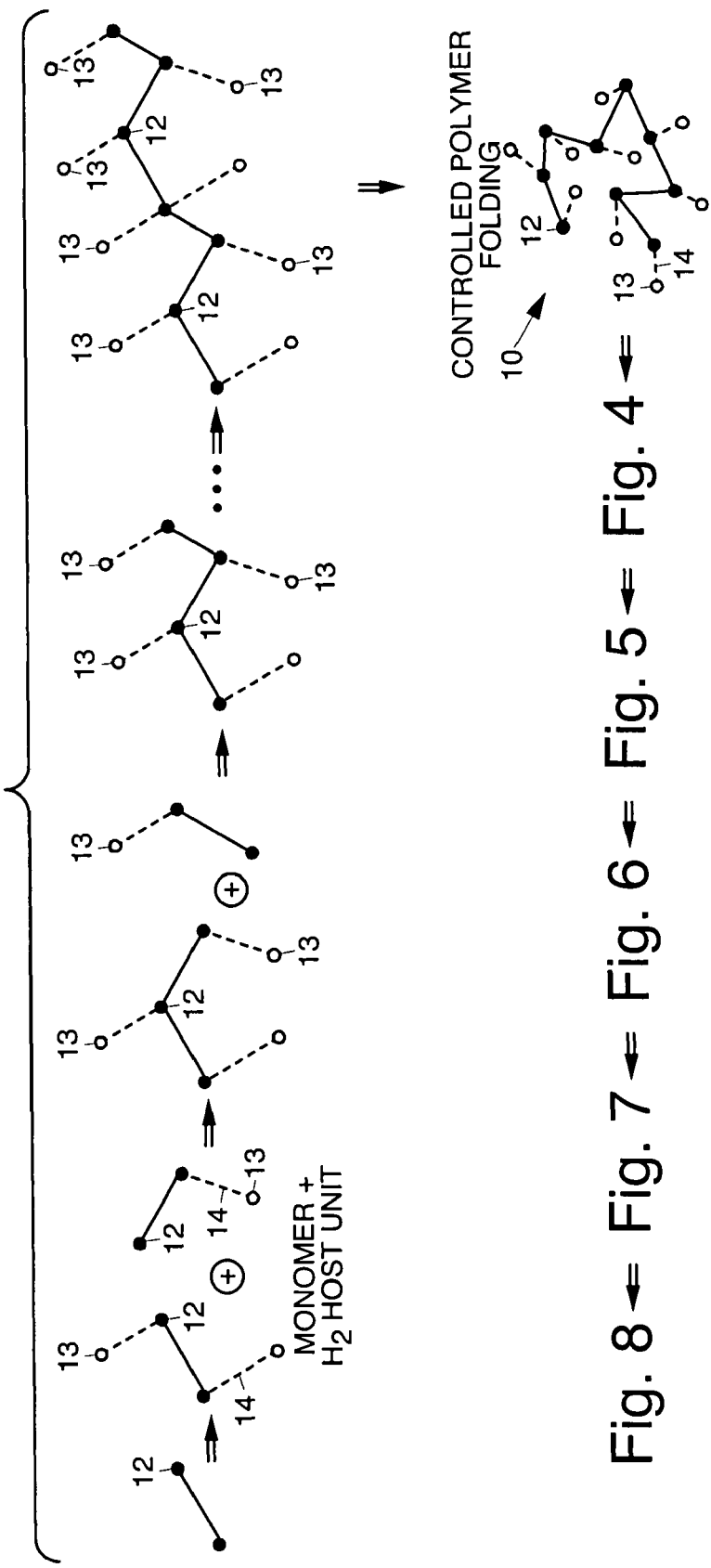

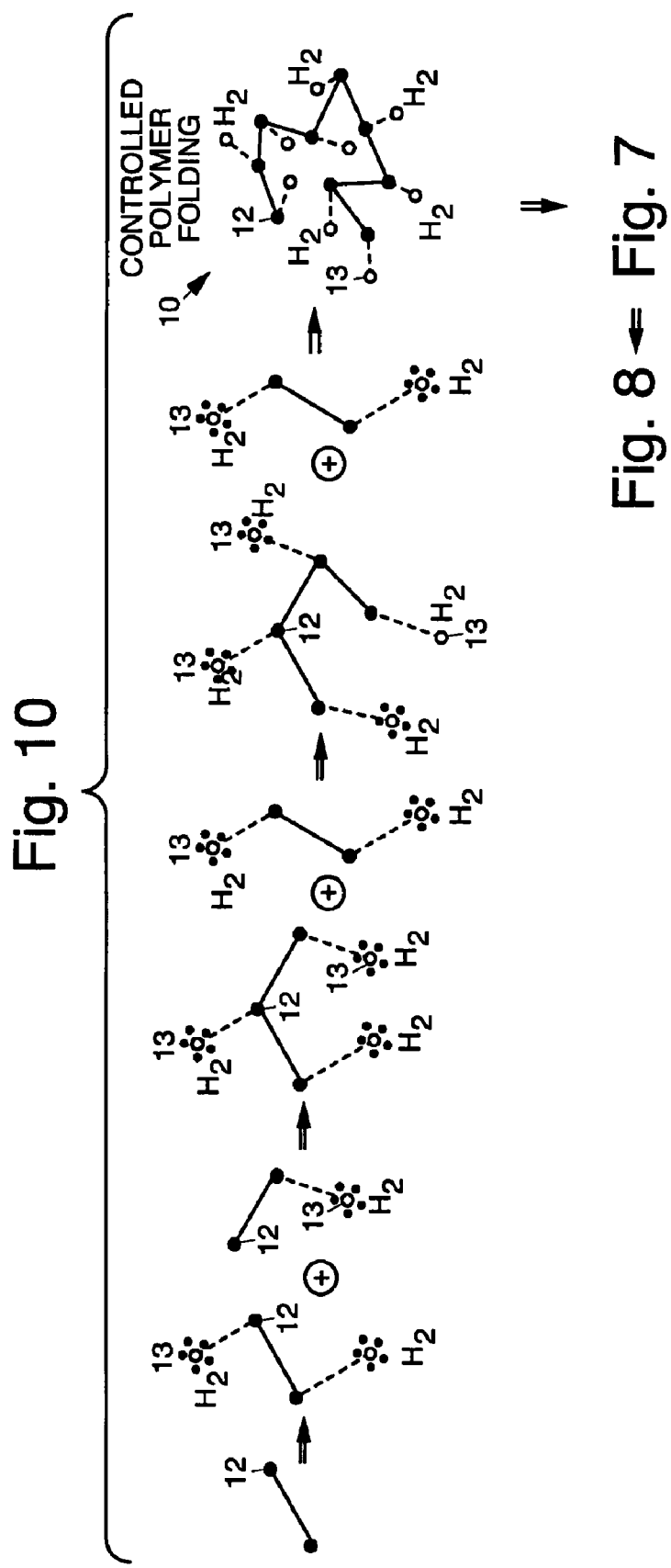

FOLDABLE HYDROGEN STORAGE MEDIA AND METHODS

This application claims the benefit of U.S. Provisional Application No. 60/849,064 filed Oct. 3, 2006.

BACKGROUND

The present invention relates generally to hydrogen storage media and methods.

Hydrogen storage involves energy storage in chemical form, and as such it is a key component in the chain of energy production, distribution and use. Hydrogen storage is a critical element of any energy system which is intended to make renewable energy production economically feasible, and enable much more efficient use of the conventional hydrocarbon-based energy sources.

Currently available hydrogen storage technology involves the use of palladium metal and palladium-based alloys, metal hydrates, carbon-based materials, including nanotubes and fullerenes, and the like. These conventional technologies have limited storage capacity, storage density, and slow uptake and release of hydrogen, are often not reversible, and have relatively high energy storage costs.

Conventional technologies are discussed by Sunita Satyapal of the DOE Hydrogen Program in a presentation entitled "Hydrogen Production and Storage R&D Activities at the U.S. Department of Energy," in "Model behaviour," Materials World, June 2005, pp. 21-23, by Xuebo Zhao, et al. in a paper entitled "Hysteretic Adsorption and Desorption of Hydrogen by Nanoporous Metal-Organic frameworks," Science, Vol. 306, pp. 1012-1015, 5 Nov. 2004, in "Filling Up With Hydrogen," Chemical & Engineering News, Vol. 83, No. 34, pp. 42-47, Aug. 22, 2005, "Building a better hydrogen trap" U or M News Service, Nov. 17, 2005, "A route to high surface area, porosity and inclusion of large molecules in crystals," Hee K. Chae, et al., Letters to Nature, Vol. 417, pp. 523-527, 5 Feb. 2004, "Hydrogen Storage in Microporous Metal-Organic frameworks," Science, Vol. 300, pp. 1127-1129, 16 May 2003, and "Design of New Materials for Methane Storage," Tina Duren, et al., Langmuir 2004, 20, 2683-2689.

It would be desirable to have improved hydrogen storage media and methods.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 shows hydrogen inclusion to hydrogen-affine host molecules of the unfolded polymer backbone;

FIG. 6 illustrates controlled folding of the polymer backbone with attached hydrogen;

FIG. 7 shows controlled unfolding of a folded polymer backbone with attached hydrogen;

FIG. 8 shows release of hydrogen from the host molecules;

FIG. 9 illustrates formation of another exemplary hydrogen storage medium; and

FIG. 10 illustrates formation of yet another exemplary hydrogen storage medium.

DETAILED DESCRIPTION

Disclosed herein is hydrogen storage technology comprising exemplary hydrogen storage media 10 and related methods that enable simultaneous ultra-high (and perhaps the highest possible) storage capacity, power density, reversibility, speed and ease (low energy storage cost) for hydrogen release. No presently available technology (palladium metal and palladium-based alloys, metal hydrates, carbon-based materials, including nanotubes and fullerenes, etc.) alone can compete with these advantages, especially when they are present concurrently in the same material as disclosed herein. However, the disclosed hydrogen storage technology may utilize the storage materials in highly dispersed state as $H_2$-host complexes.

The approaches disclosed herein provide for reversible, high density hydrogen storage that provides a mechanism for reversible uptake/storage/release of hydrogen fuel in response to combination of thermal, optical, mechanical, magnetic, electrical, or chemical stimuli. Exemplary media 10 are based on natural and/or synthetic composite materials, can potentially achieve the highest possible storage density, and use a simple and energy-efficient means for fast hydrogen uptake and release when needed.

The disclosed hydrogen storage technology exploits the ability of a polymer (e.g., a biopolymer including proteins for example) for highly compact folding and unfolding in response to thermal, chemical, mechanical, magnetic, electrical or light stimuli, which, when combined with chemically-linked hydrogen-affine host complexes, provides a framework for high capacity, high density, and reversible hydrogen storage and methods.

Figure 1:
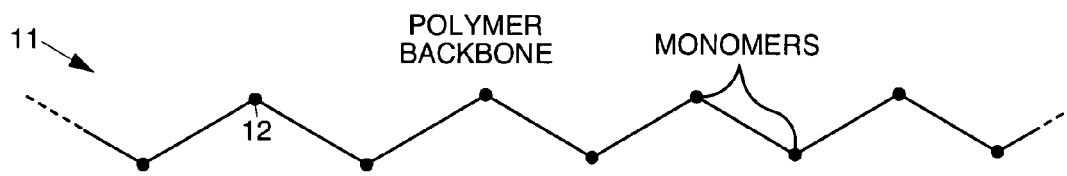
FIG. 1 illustrates an exemplary polymer backbone used to construct exemplary hydrogen storage media.

Referring to the drawing figures, FIGS. 1-8 illustrate steps involved in forming exemplary hydrogen storage media 10 and releasing hydrogen therefrom. FIG. 1 illustrates an exemplary polymer backbone 11 used to construct exemplary hydrogen storage media 10. The exemplary polymer backbone 11 shown in FIG. 1 is prepared using a number of monomers 12, for example, that are chemically linked together. Biopolymers and foldamers, for example, may be used to form the polymer backbone 11 are discussed in the Wikipedia electronic encyclopedia available on the world wide web and in scientific references cited therein. In addition, the polymer backbone 11 may be formed from monomers of the same kind or as a combination of monomers of different kinds, depending on a desired folding mechanism and state.

Figure 2:
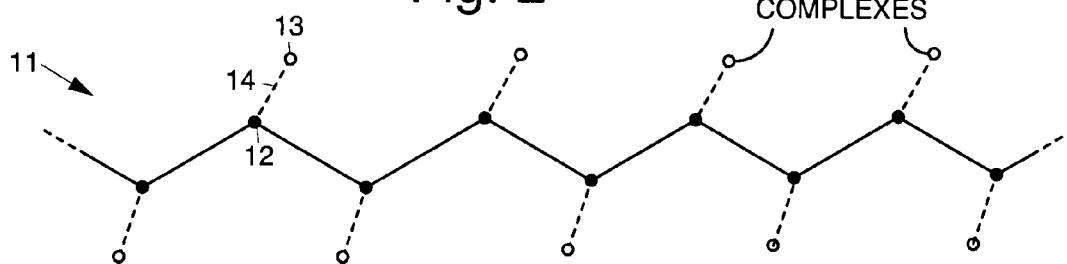
FIG. 2 shows attachment of hydrogen host complexes to the polymer backbone.

FIG. 2 illustrates attachment of hydrogen host complexes 13 to the polymer backbone 11. As is shown in FIG. 2, the hydrogen ($H_2$) host complexes 13, or hydrogen-affine host molecules 13, are attached to the formed polymer backbone 11 via chemical and physical linkers 14, such as covalent or non-covalent bonds, physiosorption, chemisorption, hydrogen bond, caging, and van der Waals interactions, for example.

Figure 3:
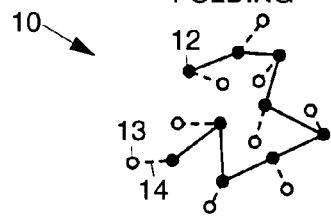
FIG. 3 illustrates controlled folding of the polymer backbone with attached hydrogen host complexes in response to predetermined stimuli.

FIG. 3 illustrates folding of the polymer backbone 11 with attached hydrogen host complexes 13 shown in FIG. 2. FIG. 3 shows the folded state of the polymer backbone 11 with attached hydrogen host complexes 13. Such folding occurs in a controlled fashion upon thermal, chemical, mechanical, electrical, magnetic or optical stimuli, for example.

Figure 4:
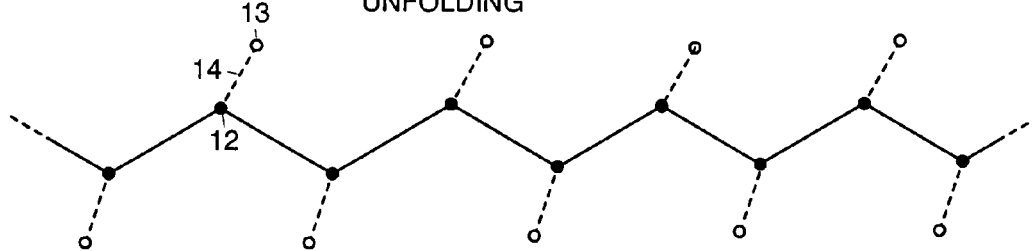
FIG. 4 illustrates controlled unfolding of a folded polymer backbone with attached hydrogen host complexes in response to predetermined stimuli.

FIG. 4 illustrates unfolding of the folded polymer backbone 11. Such unfolding occurs in response to thermal, chemical, mechanical, magnetic, electrical, or light stimuli, for example, depending upon the selection of the polymer backbone 11. For example, a change in chemical environment, such as a change in pH, may cause unfolding of the folded polymer backbone 11. Heating the folded polymer backbone 11 above a threshold temperature may by used to cause unfolding of the folded polymer backbone 11. Shining ultraviolet, visible or infrared radiation on the folded polymer backbone 11 (optical or photo stimuli) may by used to cause unfolding of the folded polymer backbone 11. Mechanical stimuli such as pressure, shear stress, vibration or acoustic waves (sonication) may be employed. Magnetic or electric triggering may also be employed. Unfolding of the folded polymer backbone 11 prepares the host complexes 13 for hydrogen inclusion. The term "inclusion" means that hydrogen is adsorbed, attached or otherwise associated by different chemical and/or physical means with the host complexes 13 and is "integrated" into the folded polymer backbone 11. Inclusion may also occur by forming a chemical compound containing hydrogen. Thus, unfolding of the folded polymer backbone 11 makes the hydrogen host sites (complexes 13) accessible. The unfolded polymer backbone 11 presents a large surface area for hydrogen to associate with.

FIG. 5 illustrates hydrogen adsorption to hydrogen-affine host molecules of the unfolded polymer backbone 11. The adsorption preferably occurs through physiosorption or weak chemisorption, either as $H_2$, proton ($H^+$), or via $H_2/H^+$-water complexes 15.

FIG. 6 illustrates folding of the polymer backbone 11 with host complexes 13 charged with hydrogen. The polymer backbone 11 folds into a compact configuration (i.e., storage mode) via thermal, chemical, mechanical, magnetic, electrical or light activation. The hydrogen sites are thus inside the folded polymer backbone 11.

FIG. 7 illustrates unfolding of a folded polymer backbone 11 with attached hydrogen or hydrogen-containing molecules and ions. The folded polymer backbone 11 unfolds from its compact storage form into a generally linear form which prepares it for release of hydrogen via thermal, chemical, mechanical, magnetic, electrical or photo (light) activation.

FIG. 8 illustrates a hydrogen release mode of the polymer backbone 11 which releases hydrogen from the host molecules. Upon activation of the polymer backbone 11 via thermal, chemical, mechanical, magnetic, electrical or photo (light) activation, the hydrogen is desorbed (released) from the host molecules. The storage media 10 is now in its final form and is available to repeat the update and storage and release processes, starting with the step shown in FIG. 4.

FIG. 9 illustrates formation of another exemplary hydrogen storage medium 10. The formation steps may be modified in the sequence shown in FIG. 9. In FIG. 9, polymer synthesis from monomers and $H_2$ host complex attachment occur concurrently. This is most useful when the storage material is not designed to be reversible, and is used only once, and upon release it is recycled or disposed.

As is shown in FIG. 9, two monomers 12 that are chemically linked together have hydrogen host complexes 13 attached thereto. Then, a third monomer 12 having an attached hydrogen host complex 13 is combined with the first two. Then another monomer 12 having an attached hydrogen host complex 13 is combined with the first three, and so on to form the completed polymer backbone 11 shown at the top right side of FIG. 9. Hydrogen inclusion, folding and release then occur as discussed above with reference to FIGS. 3-8 and as illustrated at the bottom portion of FIG. 9.

FIG. 10 illustrates formation of yet another exemplary hydrogen storage medium 10. In the sequence shown in FIG. 10, the polymer backbone synthesis from monomers, $H_2$-host complex attachment, hydrogen inclusion, and backbone folding occur concurrently. This produces a structure similar to FIG. 6. Polymer unfolding and hydrogen release occur as discussed above with reference to FIGS. 7 and 8 and as illustrated at the bottom portion of FIG. 10.

The disclosed hydrogen storage technology is suited for hydrogen storage for portable and distributed power generation, including, but not limited to, transportation fuel cells applications. Advantages of the hydrogen storage technology include (1) ultra-high storage density due to a large internal surface area available for hydrogen inclusion, (2) ease and fastness of hydrogen release upon thermal, chemical, mechanical, magnetic, electrical or light actuation, (3) use of either synthesis or naturally occurring backbone materials, (4) reversible hydrogen uptake/release, and (5) convenient recycling. The disclosed hydrogen storage media provides for high energy capacity, high power density hydrogen storage based on folding and unfolding of a polymer backbone 11 comprising a hydrogen host complex 13, with on-demand chemical, thermal, mechanical, magnetic, electrical or photo (light) actuation of hydrogen uptake and release.

Thus, improved hydrogen storage technology comprising hydrogen storage media and methods have been disclosed. It is to be understood that the above-described embodiments are merely illustrative of some of the many specific embodiments that represent applications of the principles disclosed herein. Clearly, numerous and other arrangements can be readily devised by those skilled in the art without departing from the scope of the invention.

What is claimed is:

1. Hydrogen storage apparatus comprising:
    a foldable polymer backbone comprising physico-chemically-linked hydrogen-affine host complexes as part of polymer backbone;
    wherein the polymer backbone is adapted to fold and unfold to cause hydrogen inclusion and release by the hydrogen-affine host complexes; and
    wherein the hydrogen-affine host complexes are adapted to uptake or release the hydrogen.

2. The apparatus recited in claim 1 wherein the folding and unfolding of the polymer backbone is triggered by stimulation from the group selected from: thermal stimulation, chemical stimulation, mechanical stimulation, magnetic stimulation, electrical stimulation, and optical stimulation.

3. The apparatus recited in claim 2 wherein the mechanical stimulation is selected from the group consisting of: pressure, shear stress, vibration or sonication.

4. The apparatus recited in claim 1 wherein the polymer backbone comprises a biopolymer.

5. The apparatus recited in claim 1 wherein the polymer backbone comprises a plurality of chemically linked monomers.

* * * * *